United States Patent [19]

Mennemann et al.

[11] 4,400,473

[45] * Aug. 23, 1983

[54] ACIDPROOF, HYDROLYSIS-RESISTANT OPTICAL AND OPHATHALMIC GLASS OF LOW DENSITY

[75] Inventors: Karl Mennemann, Taunusstein; Georg Gliemeroth; Volkmar Geiler, both of Mainz, all of Fed. Rep. of Germany

[73] Assignee: Schott Glaswerke, Mainz, Fed. Rep. of Germany

[*] Notice: The portion of the term of this patent subsequent to Jun. 28, 2000 has been disclaimed.

[21] Appl. No.: 384,462

[22] Filed: Jun. 2, 1982

Related U.S. Application Data

[63] Continuation-in-part of Ser. No. 282,787, Jul. 13, 1981.

[30] Foreign Application Priority Data

Jul. 14, 1980 [DE] Fed. Rep. of Germany ....... 3026605
Jun. 2, 1981 [DE] Fed. Rep. of Germany ....... 3121824

[51] Int. Cl.$^3$ ............................ C03C 3/08; C03C 3/10
[52] U.S. Cl. ...................................... 501/77; 501/75; 501/76; 501/78; 501/79; 501/901; 501/903
[58] Field of Search ...................... 501/77, 78, 79, 901, 501/903

[56] References Cited

U.S. PATENT DOCUMENTS

3,877,953 4/1975 Brömer et al. ...................... 501/903
4,084,978 4/1978 Sagara ................................. 501/903

FOREIGN PATENT DOCUMENTS

1591210 6/1981 United Kingdom .

*Primary Examiner*—Mark Bell
*Attorney, Agent, or Firm*—Millen & White

[57] ABSTRACT

An improved optical glass having an index of refraction of $\geq 1.69$, an Abbe number of $\geq 38$, and a density of $\leq 3.25$ g/cm$^3$, represents a further development of another optical glass recently provided by the same inventors. The new glass has improved suitability for continuous-tank manufacture and increased acidproofness and differs from the other glass in its content of 0.5–4.0% by weight of $P_2O_5$; its sum total of $SiO_2 + B_2O_3 + Al_2O_3 + P_2O_5$ being 38.5–41.5% by weight; and its sum total of MgO+CaO being 13–17.5% by weight. The full glass composition, e.g. is in % by weight:

| | |
|---|---|
| $SiO_2$ | 26.0–32.5 |
| $B_2O_3$ | 6.0–12.0 |
| $Al_2O_3$ | 0–3.0 |
| $P_2O_5$ | 0.5–4.0 |
| $SiO_2 + B_2O_3 + Al_2O_3 + P_2O_5 =$ | 38.5–41.5 |
| $Li_2O$ | 0–5 |
| $Na_2O$ | 0–6 |
| $K_2O$ | 0–8 |
| $Li_2O + Na_2O + K_2O =$ | 4.5–12.0 |
| MgO | 0–8 |
| CaO | 9–16 |
| MgO + CaO = | 13–17.5 |
| SrO | 0–6 |
| BaO | 0–5 |
| ZnO | 0–7 |
| PbO | 0–4 |
| SrO + BaO + ZnO + PbO = | 0–7 |
| MgO + CaO + SrO + BaO + ZnO + PbO = | 17–24 |
| $La_2O_3$ | 6–11 |
| $ZrO_2$ | 5–8 |
| $La_2O_3 + ZrO_2 =$ | 13.5–17.5 |
| $TiO_2$ | 5–9 |
| $Nb_2O_5$ | 6–11 |
| $WO_3$ | 0–4 |
| $TiO_2 + Nb_2O_5 + WO_3 =$ | 14–18 |
| $La_2O_3 + ZrO_2 + TiO_2 + Nb_2O_5 + WO_3 =$ | 28–33 |
| $ZrO_2 + TiO_2 + Nb_2O_5 =$ | 20–26 |

6 Claims, No Drawings

ACIDPROOF, HYDROLYSIS-RESISTANT OPTICAL AND OPHATHALMIC GLASS OF LOW DENSITY

CROSS REFERENCE TO RELATED APPLICATION

This application is a continuation-in-part of copending, commonly assigned application Ser. No. 282,787, filed on July 13, 1981, whose entire disclosure is incorporated by reference herein.

BACKGROUND OF THE INVENTION

Copending, commonly assigned U.S. application Ser. No. 282,787 of July 13, 1981 and its equivalent Federal Republic of Germany application No. P 30 26 605.8 describe an acidproof, hydrolytically stable, optical and ophthalmic glass of low density wherein the sum total of vitrifying agents $SiO_2+B_2O_3+Al_2O_3+GeO_2$ is 25–39% by weight. It can also comprise $P_2O_5$ instead of $GeO_2$. However, it is desired that this glass be improved for certain applications.

SUMMARY OF THE INVENTION

Accordingly, it is an object of the present invention to provide optical and ophthalmic glasses of high acid-proofness and hydrolysis resistance having an index of refraction $n_d$ of $\geq 1.69$, e.g., 1.69–1.71, an Abbe number $(v_d) > 38$, e.g., up to about 43, expansion coefficients $\alpha_{20°-300°\,C.}$ of about $(80-97) \cdot 10^{-7}$ and a density $(\rho) \leq 3.25$, e.g., of 3.15–3.25 g/cm³, and which can be continuously melted in a melting tank (crucible) and subsequently can be automatically press-molded.

Upon further study of the specification and appended claims, further objects and advantages of this invention will become apparent to those skilled in the art.

These objects have been attained by the finding that the suitability of the glass of the earlier applications of continuous-tank manufacture can be still further improved by entirely omitting $GeO_2$, incorporating $P_2O_5$ as a necessary component, and raising the sum total of vitrifying agents $SiO_2+B_2O_3+Al_2O_3+P_2O_5$ to 38.5–41.5% by weight. In addition, the glass of this invention has even further increased values of acid resistance.

Moreover, the quantitative ranges of the remaining glass ingredients in the novel glass of this invention have been considerably narrowed, in part, as compared with the quantitative ranges disclosed in the earlier applications.

DETAILED DISCUSSION

For example, borosilicate glasses are provided with 26–32.5% by weight of $SiO_2$ and 6–12% by weight of $B_2O_3$. These, as is known, are highly resistant to hydrolysis and chemical attack.

Typical narrowed-down ranges (wt. %) for the components of the novel glasses of this invention are, e.g.,

| | |
|---|---|
| $SiO_2$ | 26.0–32.5 |
| $B_2O_3$ | 6.0–12.0 |
| $Al_2O_3$ | 0–3.0 |
| $P_2O_5$ | 0.5–4.0 |
| $SiO_2 + B_2O_3 + Al_2O_3 + P_2O_5 = 38.5–41.5$ | |
| $Li_2O$ | 0–5 |
| $Na_2O$ | 0–6 |
| $K_2O$ | 0–8 |
| $Li_2O + Na_2O + K_2O = 4.5–12.0$ | |
| $MgO$ | 0–8 |
| $CaO$ | 9–16 |
| $MgO + CaO = 13–17.5$ | |
| $SrO$ | 0–6 |
| $BaO$ | 0–5 |
| $ZnO$ | 0–7 |
| $PbO$ | 0–4 |
| $SrO + BaO + ZnO + PbO = 0–7$ | |
| $MgO + CaO + SrO + BaO + ZnO + PbO = 17–24$ | |
| $La_2O_3$ | 6–11 |
| $ZrO_2$ | 5–8 |
| $La_2O_3 + ZrO_2 = 13.5–17.5$ | |
| $TiO_2$ | 5–9 |
| $Nb_2O_5$ | 6–11 |
| $WO_3$ | 0–4 |
| $TiO_2 + Nb_2O_5 + WO_3 = 14–18$ | |
| $La_2O_3 + ZrO_2 + TiO_2 + Nb_2O_5 + WO_3 = 28–33$ | |
| $ZrO_2 + TiO_2 + Nb_2O_5 = 20–26$ | |

A preferred class of glasses has the following composition (wt. %)

| | |
|---|---|
| $SiO_2$ | 29–32 |
| $B_2O_3$ | 7.5–10 |
| $P_2O_5$ | 0.5–2.5 |
| $Al_2O_3$ | 0–3 |
| $SiO_2 + B_2O_3 + Al_2O_3 + P_2O_5 = 38.5–41.5$ | |
| $Li_2O$ | 0.5–4 |
| $Na_2O$ | 1.5–3.5 |
| $K_2O$ | 2.5–7 |
| $Li_2O + Na_2O + K_2O = 6–10$ | |
| $MgO$ | 1.0–5.0 |
| $CaO$ | 10.0–13.5 |
| $MgO + CaO = 13–17$ | |
| $SrO$ | 0–5 |
| $ZnO$ | 0–7 |
| $BaO$ | 0–5 |
| $PbO$ | 0–4 |
| $SrO + ZnO + BaO + PbO = 0–7$ | |
| $MgO + CaO + SrO + ZnO + BaO + PbO = 16–22$ | |
| $La_2O_3$ | 6–11 |
| $ZrO_2$ | 5–8 |
| $La_2O_3 + ZrO_2$ | 13.5–17.5 |
| $TiO_2$ | 5–9 |
| $Nb_2O_5$ | 6–11 |
| $TiO_2 + Nb_2O_5 = 15–17$ | |
| $La_2O_3 + ZrO_2 + TiO_2 + Nb_2O_5 = 28–33$ | |
| $ZrO_2 + TiO_2 + Nb_2O_5\ 21–25$ | |

The most preferred glasses have the following compositions (wt. %):

| | |
|---|---|
| $SiO_2$ | 30.5–31.5 |
| $B_2O_3$ | 8.0–9.0 |
| $Li_2O$ | 1.0–2.0 |
| $Na_2O$ | 2.0–4.0 |
| $K_2O$ | 3.0–5.0 |
| $MgO$ | 2.0–4.0 |
| $CaO$ | 11.0–13.0 |
| $La_2O_3$ | 8.5–9.5 |
| $ZrO_2$ | 6.5–8.0 |
| $TiO_2$ | 7.0–9.0 |
| $Nb_2O_5$ | 7.0–9.0 |
| $SrO$ | 2.0–4.0 |
| $P_2O_5$ | 1.0–2.0 |
| or | |
| $SiO_2$ | 29.0–30.5 |
| $B_2O_3$ | 8.0–10.0 |
| $Li_2O$ | 2.0–4.0 |
| $Na_2O$ | 2.0–4.0 |
| $K_2O$ | 3.0–5.0 |
| $MgO$ | 3.0–5.0 |
| $CaO$ | 10.0–12.0 |
| $La_2O_3$ | 7.0–8.5 |
| $ZrO_2$ | 7.0–8.0 |
| $TiO_2$ | 6.0–8.0 |
| $Nb_2O_5$ | 9.0–11.0 |

-continued

| | |
|---|---|
| $P_2O_5$ | 1.0–2.0 |
| ZnO | 3.0–5.0 |

All details of making and using the glasses of this invention are the same as disclosed in parent applications Ser. No. 282,787 unless specified otherwise herein, or inconsistent with anything disclosed herein; e.g., the glasses of this invention will be advantageous in use because of the superior preparation discussed above. Considerations analogous to those discussed in the earlier application can be routinely and conventionally used to determine precise compositions for glasses having desired properties. For example, a portion of the oxygen content of the glass, e.g., up to 1.0 weight percent can, optionally, be replaced by F-atoms.

EXAMPLES

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are be weight.

The following examples illustrate typical compositions of this invention and their advantageous properties.

TABLE

| Example | 1 | 2 | 3 | 4 |
|---|---|---|---|---|
| $SiO_2$ | 31.05 | 31.60 | 31.50 | 29.74 |
| $B_2O_3$ | 8.83 | 8.50 | 8.73 | 9.27 |
| $Li_2O$ | 1.10 | — | 1.09 | 3.00 |
| $Na_2O$ | 2.74 | 2.65 | 2.71 | 2.18 |
| $K_2O$ | 4.15 | 4.00 | 4.10 | 3.30 |
| MgO | 2.97 | 4.00 | 1.96 | 4.05 |
| CaO | 12.39 | 11.30 | 12.25 | 10.43 |
| $La_2O_3$ | 8.93 | 7.65 | 9.49 | 7.37 |
| $ZrO_2$ | 7.56 | 7.30 | 7.47 | 7.74 |
| $TiO_2$ | 8.04 | 6.50 | 7.47 | 6.33 |
| $Nb_2O_5$ | 7.50 | 9.10 | 7.74 | 10.70 |
| $P_2O_5$ | 1.10 | 0.85 | 0.71 | 1.80 |
| SrO | 3.56 | 3.65 | 4.78 | — |
| ZnO | — | 2.90 | — | 4.09 |
| nd | 1.70117 | 1.69291 | 1.69821 | 1.70407 |
| vd | 39.37 | 39.69 | 39.73 | 39.36 |
| ρ | 3.20 | 3.22 | 3.23 | 3.19 |
| AR[1] | 2 | 2 | 2 | 2 |
| CRYSTALL.5[2] | | | | |
| OEG | /1040 | /1010 | /965 | /975 |
| Kg max/T | 2.1/935 | 1.3/930 | 1.7/885 | 2.6/870 |

NOTES TO TABLE
[1]Determination of resistance to acids according to the method described in Schott Catalogue 311 d (1980) "Optisches Glass" (Optical Glass)
[2]Carrier sheet test described in: Grauer, O. H. and Hamilton, D. H., J. Research NBS 44,495 (1950).

5 = 5 min tempering
OEG = upper divitrification temperature
Kg max/T — maximum crystal growth rate in μ/min/ at corresponding temperature (°C.).

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. An optical and ophthalmic glass having $n_d 22$ 1.69, $v_d \geq 38$, a density $\geq 3.25$ g/cm$^3$, an expansion coefficient $\alpha_{20°-300°}$ C. of $(80-97) \cdot 10^{-7}$, a high acid and hydrolysis resistance and sufficient stability for continuous-tank manufacture,
consisting essentially of, in wt. %, 2. A glass of claim 1, of the composition in % by weight.

| | |
|---|---|
| $SiO_2$ | 29–32 |
| $B_2O_3$ | 7.5–10 |
| $P_2O_5$ | 0.5–2.5 |
| $Al_2O_3$ | 0–3 |
| $SiO_2 + B_2O_3 + Al_2O_3 + P_2O_5$ = | 38.5–41.5 |
| $Li_2O$ | 0.5–4 |
| $Na_2O$ | 1.5–3.5 |
| $K_2O$ | 2.5–7 |
| $Li_2O + Na_2O + K_2O$ = | 6–10 |
| MgO | 1.0–5.0 |
| CaO | 10.0–13.5 |
| MgO + CaO = | 13–17 |
| SrO | 0–5 |
| ZnO | 0–7 |
| BaO | 0–5 |
| PbO | 0–4 |
| SrO + ZnO + BaO + PbO = | 0–7 |
| MgO + CaO + SrO + ZnO + BaO + PbO = | 16–22 |
| $La_2O_3$ | 6–11 |
| $ZrO_2$ | 5–8 |
| $La_2O_3 + ZrO_2$ | 13.5–17.5 |
| $TiO_2$ | 5–9 |
| $Nb_2O_5$ | 6–11 |
| $TiO_2 + Nb_2O_5$ = | 15–17 |
| $La_2O_3 + ZrO_2 + TiO_2 + Nb_2O_5$ = | 28–33 |
| $ZrO_2 + TiO_2 + Nb_2O_5$ | 21–25 |

3. A glass of claim 1, of the composition in % by weight,

| | |
|---|---|
| $SiO_2$ | 30.5–31.5 |
| $B_2O_3$ | 8.0–9.0 |
| $Li_2O$ | 1.0–2.0 |
| $Na_2O$ | 2.0–4.0 |
| $K_2O$ | 3.0–5.0 |
| MgO | 2.0–4.0 |
| CaO | 11.0–13.0 |
| $La_2O_3$ | 8.5–9.5 |
| $ZrO_2$ | 6.5–8.0 |
| $TiO_2$ | 7.0–9.0 |
| $Nb_2O_5$ | 7.0–9.0 |
| SrO | 2.0–4.0 |
| $P_2O_5$ | 1.0–2.0 |

4. A glass of claim 1, of the composition in % by weight,

| | |
|---|---|
| $SiO_2$ | 29.0–30.5 |
| $B_2O_3$ | 8.0–10.0 |
| $Li_2O$ | 2.0–4.0 |
| $Na_2O$ | 2.0–4.0 |
| $K_2O$ | 3.0–5.0 |
| MgO | 3.0–5.0 |
| CaO | 10.0–12.0 |
| $La_2O_3$ | 7.0–8.5 |
| $ZrO_2$ | 7.0–8.0 |
| $TiO_2$ | 6.0–8.0 |
| $Nb_2O_5$ | 9.0–11.0 |
| $P_2O_5$ | 1.0–2.0 |
| ZnO | 3.0–5.0 |

5. A lens made of the glass of claim 1 or 2.
6. A lens of claim 5 wherein the lens is an eyeglass lens.

* * * * *

UNITED STATES PATENT AND TRADEMARK OFFICE
CERTIFICATE OF CORRECTION

PATENT NO. : 4,400,473  
DATED : August 23, 1983  
INVENTOR(S) : MENNEMANN ET AL Page 1 of 3

It is certified that error appears in the above-identified patent and that said Letters Patent is hereby corrected as shown below:

Column 4, line 4: reads "1. An optical and ophthalmic glass having $n_d 22\ 1.69$, "
should read -- 1. An optical and ophthalmic glass having $n_d > 1.69$, --

Column 4, after line 9 insert:

| | | |
|---|---|---|
| $SiO_2$ | 26.0 - | 32.5 |
| $B_2O_3$ | 6.0 - | 12.0 |
| $Al_2O_3$ | 0 - | 3.0 |
| $P_2O_5$ | 0.5 - | 4.0 |
| $SiO_2 + B_2O_3 + Al_2O_3 + P_2O_5$ = | 38.5-41.5 | |
| $Li_2O$ | 0 - | 5 |
| $Na_2O$ | 0 - | 6 |
| $K_2O$ | 0 - | 8 |

UNITED STATES PATENT AND TRADEMARK OFFICE
CERTIFICATE OF CORRECTION

PATENT NO. : 4,400,473
DATED : August 23, 1983
INVENTOR(S) : MENNEMANN ET AL

It is certified that error appears in the above-identified patent and that said Letters Patent is hereby corrected as shown below:

$Li_2O + Na_2O + K_2O$ = 4.5 - 12.0
MgO 0 - 8
CaO 9 - 16

MgO + CaO = 13 - 17.5
SrO 0 - 6
BaO 0 - 5
ZnO 0 - 7
PbO 0 - 4

SrO + BaO + ZnO + PbO = 0 - 7
MgO + CaO + SrO + BaO + ZnO + PbO = 17 - 24
$La_2O_3$ 6 - 11
$ZrO_2$ 5 - 8
$La_2O + ZrO_2$ = 13.5 - 17.5
$TiO_2$ 5 - 9
$Nb_2O_5$ 6 - 11
$WO_3$ 0 - 4

UNITED STATES PATENT AND TRADEMARK OFFICE
CERTIFICATE OF CORRECTION

PATENT NO. : 4,400,473

DATED : August 23, 1983

INVENTOR(S) : MENNEMANN ET AL

It is certified that error appears in the above-identified patent and that said Letters Patent is hereby corrected as shown below:

$$TiO_2 + Nb_2O_5 + WO_3 = 14 - 18$$

$$La_2O_3 + ZrO_2 + TiO_2 + Nb_2O_5 + WO_3 = 28 - 33$$

$$ZrO_2 + TiO_2 + Nb_2O_5 = 20 - 26$$

Signed and Sealed this

First Day of November 1983

[SEAL]

Attest:

GERALD J. MOSSINGHOFF

Attesting Officer

Commissioner of Patents and Trademarks